US006898240B2

(12) United States Patent
Prakash et al.

(10) Patent No.: US 6,898,240 B2
(45) Date of Patent: May 24, 2005

(54) PREDICTIVE EDGE EXTENSION INTO UNCOVERED REGIONS

(75) Inventors: Adityo Prakash, Redwood Shores, CA (US); Eniko F. Prakash, Redwood Shores, CA (US); Edward Ratner, Sunnyvale, CA (US); John S. Chen, San Jose, CA (US)

(73) Assignee: PTS Corporation, San Jose, CA (US)

( * ) Notice: Subject to any disclaimer, the term of this patent is extended or adjusted under 35 U.S.C. 154(b) by 635 days.

(21) Appl. No.: 10/094,427

(22) Filed: Mar. 7, 2002

(65) Prior Publication Data

US 2002/0131639 A1 Sep. 19, 2002

Related U.S. Application Data

(60) Provisional application No. 60/274,129, filed on Mar. 7, 2001.

(51) Int. Cl.$^7$ ................................................. H04N 7/12
(52) U.S. Cl. .............................. 375/240.08; 375/240.01
(58) Field of Search ......................... 375/240.01, 240.08

(56) References Cited

U.S. PATENT DOCUMENTS

| | | | | |
|---|---|---|---|---|
| 5,686,956 A | * | 11/1997 | Oh et al. ................... | 348/14.15 |
| 6,600,786 B1 | * | 7/2003 | Prakash et al. ........... | 375/240.25 |
| 6,766,055 B2 | * | 7/2004 | Matsugu et al. ........... | 382/173 |
| 6,778,698 B1 | * | 8/2004 | Prakash et al. ............ | 382/164 |
| 2003/0053705 A1 | * | 3/2003 | Washizawa ................. | 382/253 |

FOREIGN PATENT DOCUMENTS

WO   WO 00/77735 A1   12/2000

OTHER PUBLICATIONS

Goh, W.B. et al., Bi–Directional 3D Auto–regressive Model Approach to Motion Picture Restoration, 1996, IEEE, pp. 2275–2278.*
Altunbasak, Yucel et al., Occlusion–Adaptive, Content– Based Mesh Design and Forward Tracking, Sep. 1997, IEEE Transactions on Image Processing, vol. 6 No. 9, pp. 1270–1280.*
John S. Chen, et al. "Method and Apparatus For Raw Edge Extension" U.S. Appl. No. 60/274,129, filed Mar. 7, 2001.
Adityo Prakash, et al. "Method and Apparatus For Efficient Video Processing" U.S. Appl. No. 09/550,705, filed Apr. 17, 2000.

* cited by examiner

*Primary Examiner*—Chris Kelley
*Assistant Examiner*—Matthew Haney
(74) *Attorney, Agent, or Firm*—Okamoto & Benedicto LLP

(57) ABSTRACT

One embodiment comprises a method for image processing. The method includes identifying an uncovered region in an image, determining at least one trivalent point, and extrapolating from the trivalent point to extend an edge of at least one of the image segments into the uncovered region. Another embodiment comprises an apparatus for image processing. The apparatus includes a predictor for predicting higher-frequency boundary information in newly uncovered regions. Another embodiment comprises a system for efficiently communicating video information. The system includes an encoder that encodes a video frame into an encoded frame, and a decoder that receives and decodes the encoded frame, wherein the encoder and decoder are both configured to identify uncovered regions and to extend edges from neighboring image segments into the uncovered region.

35 Claims, 12 Drawing Sheets

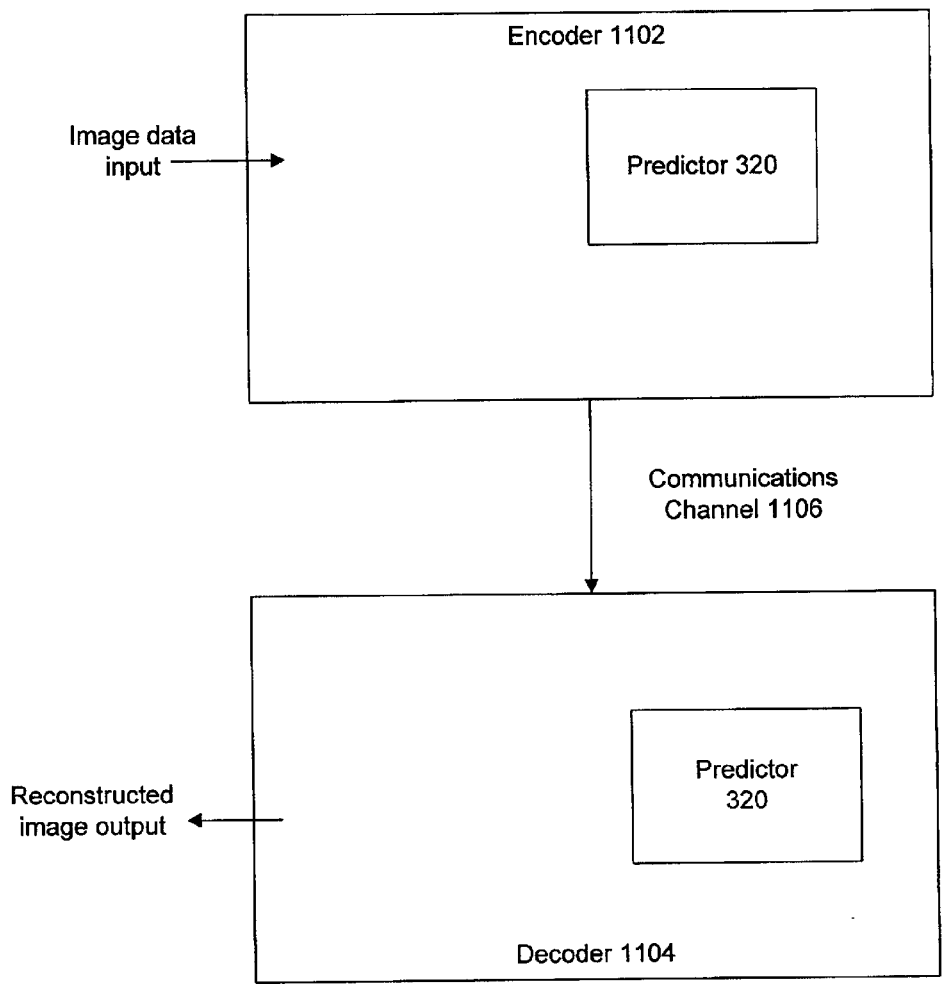
FIG. 11    1100

PREDICTIVE EDGE EXTENSION INTO UNCOVERED REGIONS

CROSS-REFERENCES TO RELATED APPLICATIONS

This patent application claims priority from U.S. Provisional Patent Application No. 60/274,129, filed Mar. 7, 2001 and entitled "Method and apparatus for raw edge extension," the disclosure of which is incorporated herein by reference. This patent application is related to U.S. patent application Ser. No. 09/550,705, filed Apr. 17, 2000 and entitled "Method and Apparatus for Efficient Video Processing," the disclosure of which is incorporated herein by reference. This patent application is also related to U.S. patent application Ser. No. 09/591,438, filed Jun. 9, 2000 and entitled "Method and Apparatus for Digital Image Segmentation," the disclosure of which is incorporated herein by reference.

FIELD OF THE INVENTION

The present invention relates in general to image processing. More particularly, it relates to segment- or object-based image processing.

BACKGROUND OF THE INVENTION

It is often desirable to identify and delineate segments or objects in an image. Information regarding segments or objects in an image may be used to facilitate digital image or video processing.

In certain circumstances, a previously hidden area of an image may become uncovered. For example, in video processing, a frame may include various segments or objects. In a subsequent frame, one or more of the segments or objects may move. Where a segment or object used to be (prior to moving), a previously hidden area may become visible.

Processing such newly uncovered areas can be problematic and done inefficiently. For example, when similar areas become newly uncovered in MPEG encoding (due to movement of blocks), MPEG applies discrete cosine transform (DCT) coding to the newly uncovered areas and transmits the entire newly uncovered image region to the decoding device. This approach is disadvantageous in that it results in inefficient image compression.

SUMMARY

One embodiment of the invention comprises a method for image processing. The method includes identifying an uncovered region in an image, determining at least one trivalent point, and extrapolating from the trivalent point to extend an edge of at least one of the image segments into the uncovered region.

Another embodiment of the invention comprises an apparatus for image processing. The apparatus includes a predictor for predicting higher-frequency boundary information in newly uncovered regions.

Another embodiment of the invention comprises a system for efficiently communicating video information. The system includes an encoder that encodes a video frame into an encoded frame, and a decoder that receives and decodes the encoded frame, wherein the encoder and decoder are both configured to identify uncovered regions and to extend edges from neighboring image segments into the uncovered region.

BRIEF DESCRIPTION OF THE DRAWINGS

FIG. 11 is a diagram of a system for communicating video in accordance with an embodiment of the invention.

DETAILED DESCRIPTION

Figure 1:
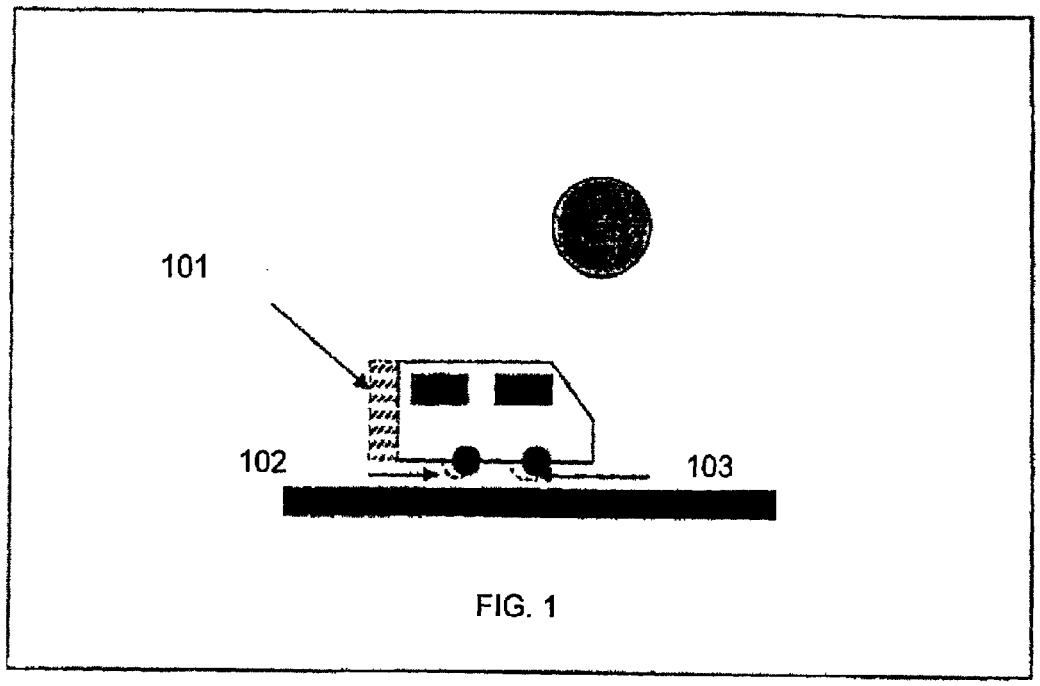
FIG. 1 is an illustration depicting a previously hidden area becoming visible (i.e. becoming an uncovered region) due to segment motion.

FIG. 1 is an illustration depicting a previously hidden or occluded area becoming visible (i.e. becoming an uncovered region) due to segment motion. As shown in FIG. 1, as the vehicle segment(s) moves, three previously hidden areas (101, 102, and 103) become visible. These uncovered regions are: the region 101 behind the back of the car; the region 102 behind the rear wheels; and the region 103 behind the front wheels.

Figure 2:
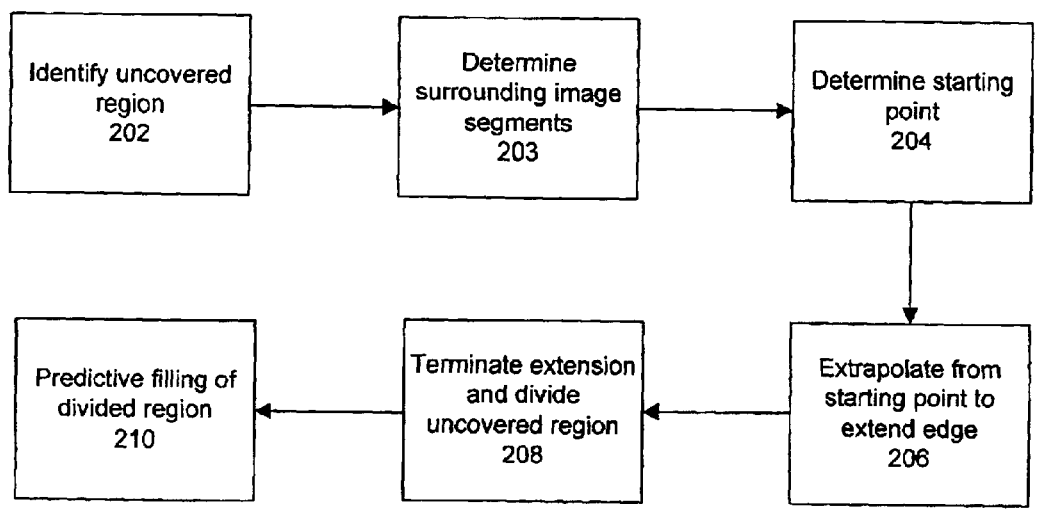
FIG. 2 is a flow chart depicting a method for image processing in accordance with an embodiment of the invention.

FIG. 2 is a flow chart depicting a method for image processing in accordance with an embodiment of the invention. The method 200 depicted in FIG. 2 includes six steps (202, 203, 204, 206, 208, and 210).

In the first step 202, an uncovered region in a frame is identified. Examples of such uncovered regions are depicted in FIG. 1. Uncovered regions may be considered as part of the residue after motion prediction. (Residue information after motion prediction includes information from uncovered regions, information from inexact matches, and newly appearing information.) Segment-based motion prediction and residues are discussed further in U.S. patent application Ser. No. 09/550,705, filed Apr. 17, 2000 and entitled "Method and Apparatus for Efficient Video Processing," the disclosure of which is incorporated herein by reference. Digital image segmentation is discussed further in U.S. patent application Ser. No. 09/591,438, filed Jun. 9, 2000 and entitled "Method and Apparatus for Digital Image Segmentation," the disclosure of which is incorporated herein by reference.

In the second step 203, a determination is made as to the image segments surrounding the uncovered region. In one embodiment, a surrounding segment must share a common boundary with the newly uncovered region. In another embodiment, the common boundary must be of a certain minimum size.

Figure 7:
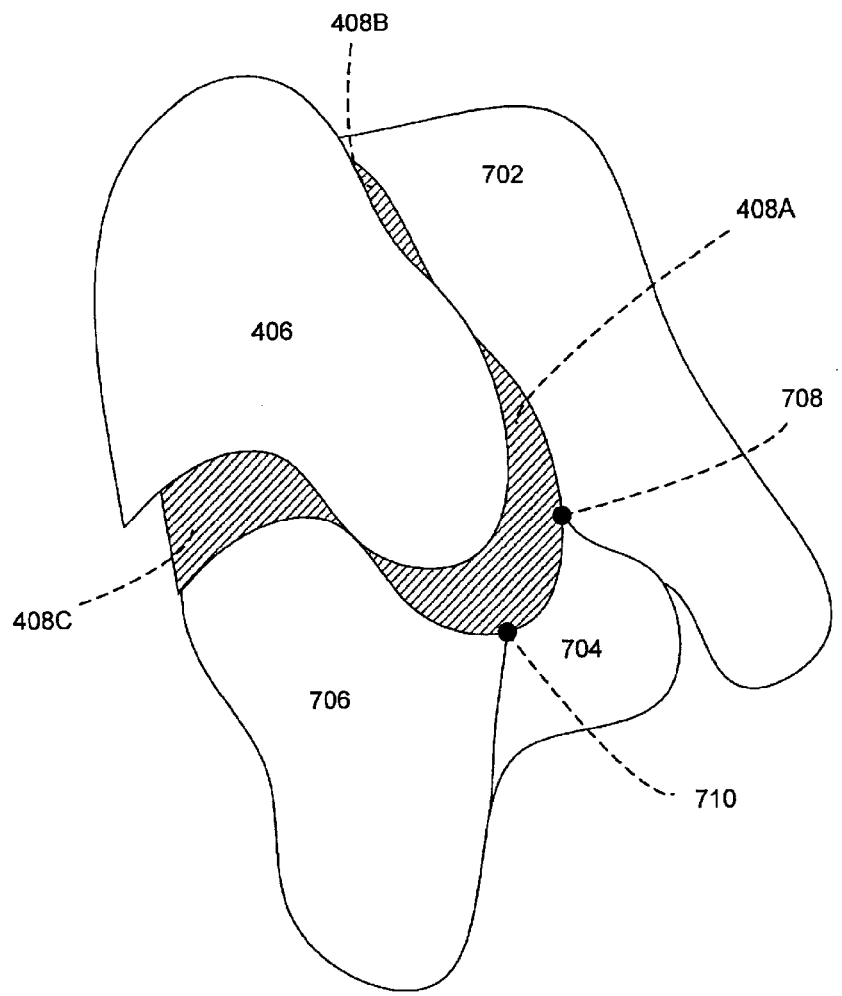
FIG. 7 is an illustration depicting multiple trivalent points adjacent to an uncovered region in accordance with an embodiment of the invention.

In the third step 204, a starting point is determined. In accordance with an embodiment of the invention, the starting point comprises a trivalent point. A trivalent point is a point at the intersection of three image "objects." The objects may be either image segments or an uncovered region. In particular, a trivalent point may be at the intersection between two image segments and an uncovered region. A trivalent point is depicted, for example, in FIG. 4 (described below). FIG. 7 (described below) depicts an example of multiple trivalent points adjacent to an uncovered region.

Figure 8:
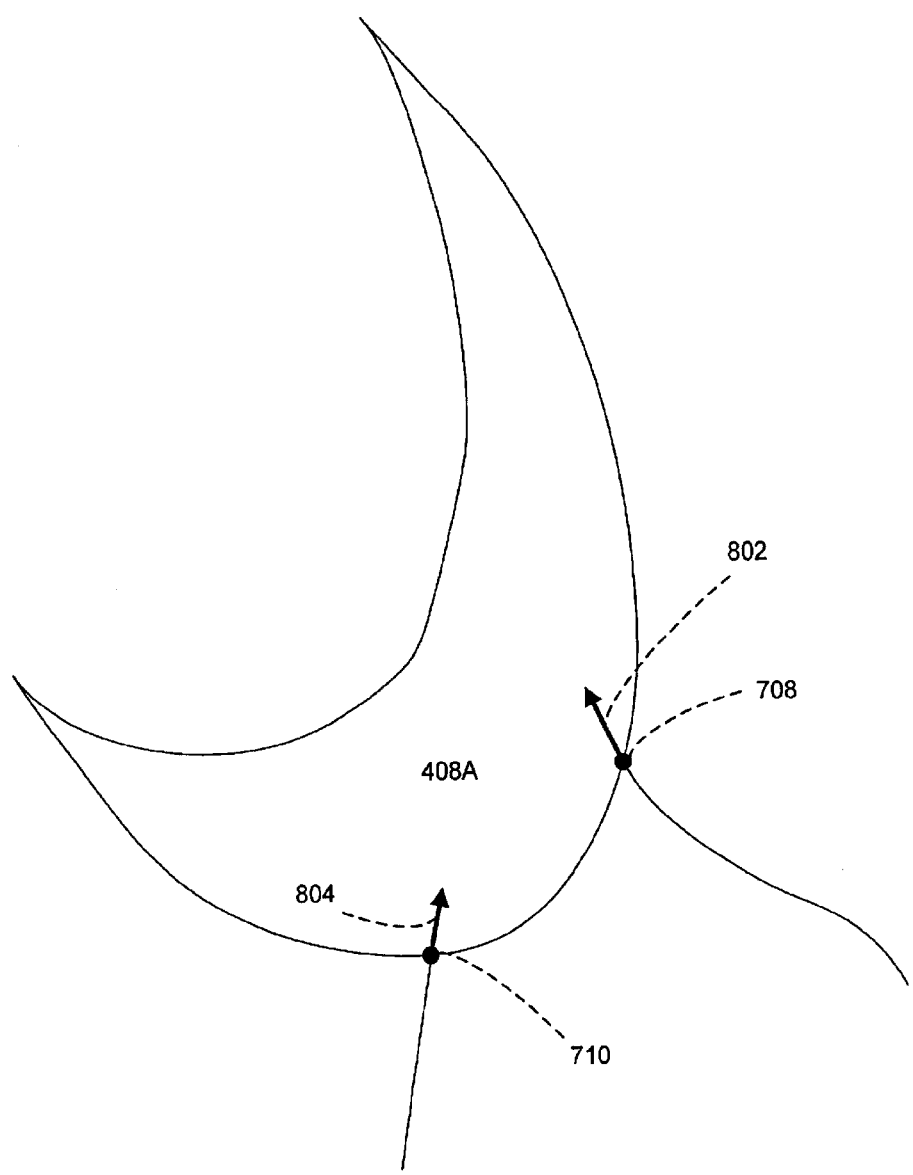
FIG. 8 is an illustration depicting predictive extension of multiple edges in accordance with an embodiment of the invention.

In the fourth step 206, extrapolation from the starting point occurs to extend a segment edge. The extrapolation extends the edge from the starting point into the uncovered region. The extrapolation may be performed using directional information from the edge to be extended. An edge extension from a starting point into an uncovered region is depicted, for example, in FIG. 5 (described below). FIG. 8 (described below) depicts an example of edge extension from multiple starting points into an uncovered region.

Figure 9:
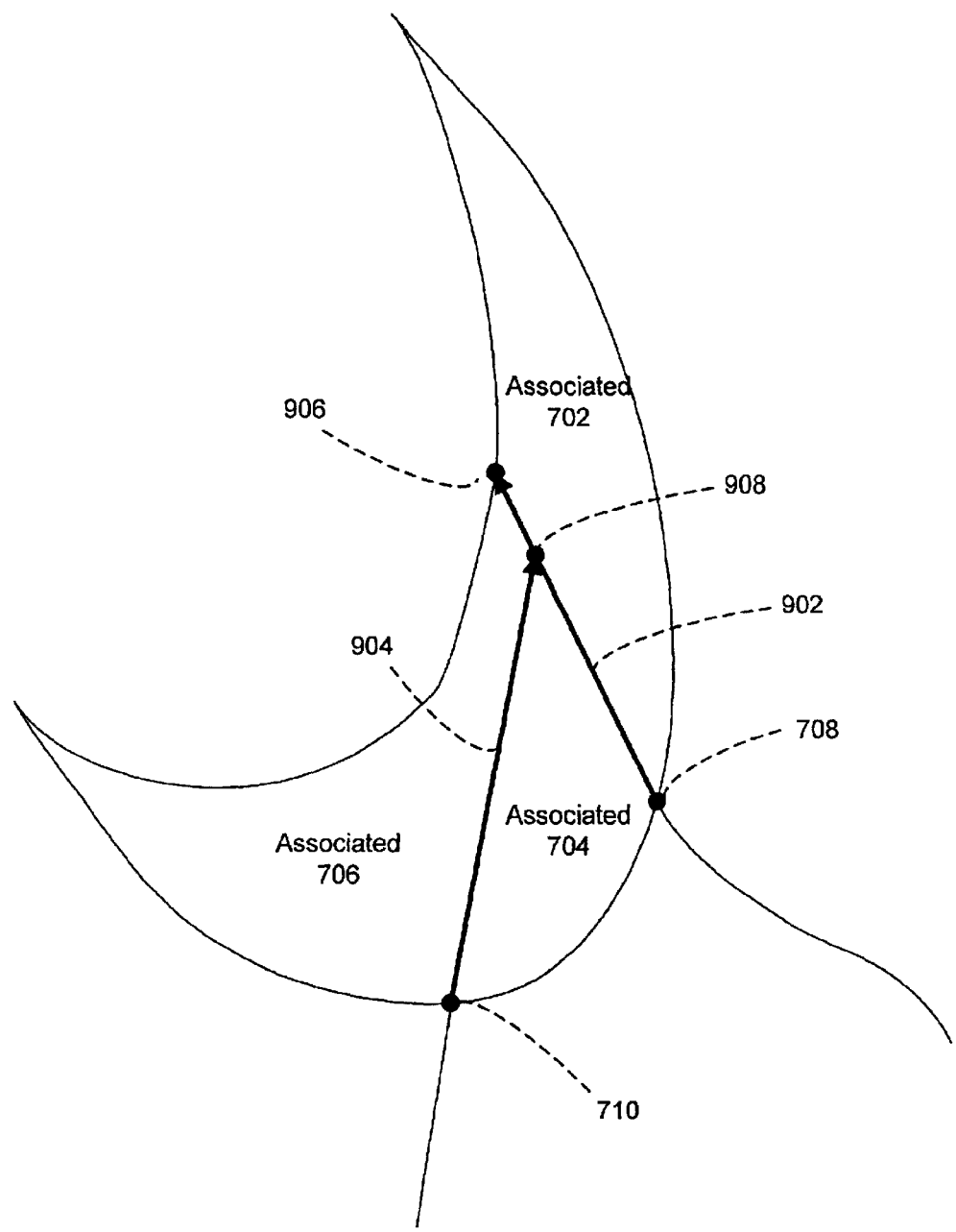
FIG. 9 is an illustration depicting the predictive extension of a first edge that terminates at a boundary of the uncovered region and of a second edge that terminates at the first edge in accordance with an embodiment of the invention.

Finally, in the fifth step 208, the extrapolation continues until the edge extension reaches a termination point. The termination point may be, for example, a point on the boundary of the uncovered region. As a result of the edge extension until termination, the uncovered region is divided such that each division may be associated with an adjacent image segment. Edge extension until termination, the resulting division of an uncovered region, and the associations of the divisions and surrounding segments are depicted, for example, in FIG. 6 (described below). FIG. 9 depicts an example of multiple edge extensions until termination and the resulting division of an uncovered region.

In one embodiment, using the output of the method 200, the divisions of the uncovered regions may be predictively filled. The predictive filling may be accomplished by applying a predictive filling routine to expand lower-frequency information from adjacent segments into the associated divisions of the uncovered region.

Figure 3:
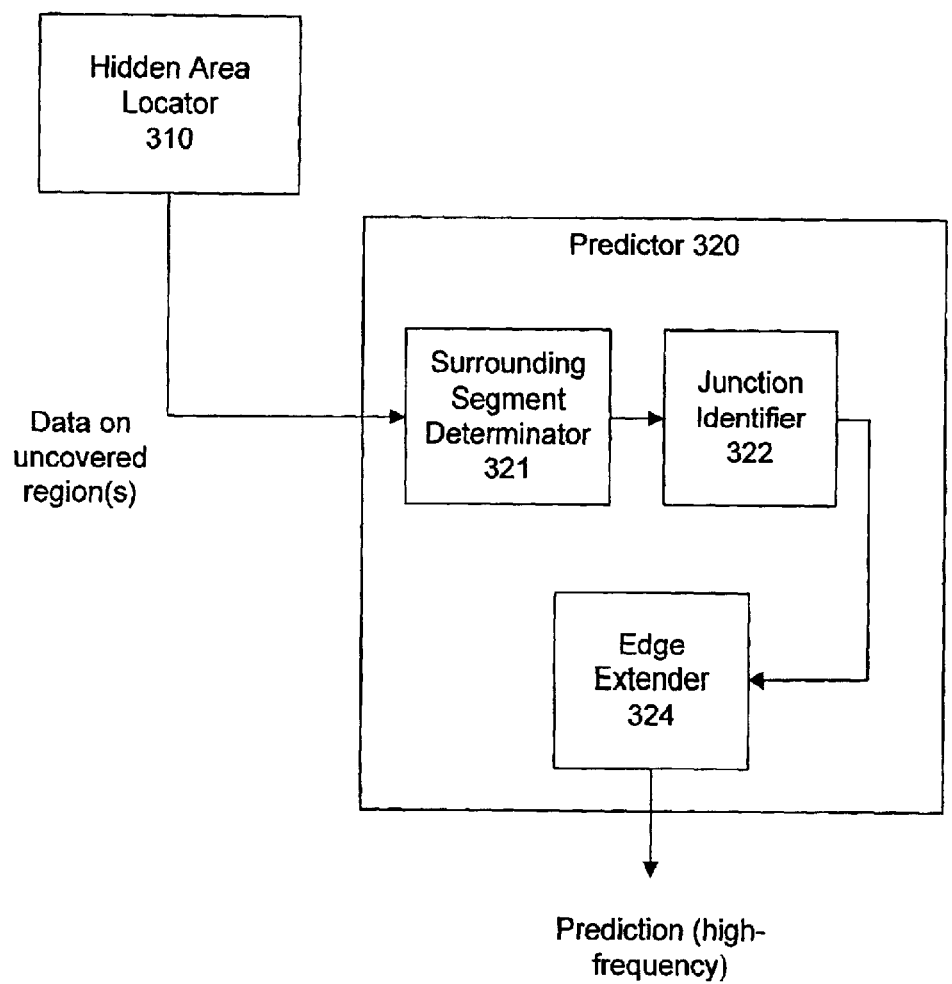
FIG. 3 is a diagram of an apparatus including a predictor for uncovered regions in accordance with an embodiment of the invention.

FIG. 3 is a diagram of an apparatus including a predictor for uncovered regions in accordance with an embodiment of the invention. The predictor 320 may receive as input information or data relating to uncovered regions in an image frame. The predictor 320 may output predicted high-frequency information for the uncovered regions in the frame. The predictor 320 depicted in FIG. 3 includes three components working in cooperation with each other (321, 322, 324).

In one embodiment, the input into the predictor 320 may be received from a hidden area locator 310. The hidden area locator 310 is configured to locate uncovered regions (previously hidden or occluded areas) in a frame. As mentioned above, the uncovered regions may be considered as part of the residue after motion prediction. The hidden area locator 302 analyzes the residue after motion prediction and determines which residues correspond to uncovered areas. Other residues (besides those corresponding to uncovered areas) may correspond to inexact matches or newly appearing information. Of course, in other embodiments, the hidden area locator 310 may be integrated with the predictor 320 or may be integrated with another component.

The first component of the predictor 320 comprises a surrounding segment determinator 321. The surrounding segment determinator 321 is configured to determine the image segments surrounding the uncovered region. In one embodiment, a surrounding segment must share a common boundary with the newly uncovered region. In another embodiment, the common boundary must be of a certain minimum size.

The second component of the predictor 320 comprises a junction identifier 322. The junction identifier 322 is configured to determine the starting points. In accordance with an embodiment of the invention, the junction identifier 322 locates trivalent points adjacent to the uncovered region and designates those trivalent points as starting points. As mentioned above, a trivalent point is a point at the intersection of three image "objects." The objects may be either image segments or an uncovered region. In particular, a trivalent point may be at the intersection between two image segments and an uncovered region. A trivalent point is depicted, for example, in FIG. 4 (described below). FIG. 7 (described below) depicts an example of multiple trivalent points adjacent to an uncovered region.

The third component comprises an edge extender 324. The edge extender 324 extends an edge by extrapolation from the starting point into the uncovered region. The extrapolation may be performed using directional information from the edge to be extended. An edge extension from a starting point into an uncovered region is depicted, for example, in FIG. 5 (described below). FIG. 8 (described below) depicts an example of edge extension from multiple starting points into an uncovered region.

The edge extender 324 also terminates extension of the edges at appropriate termination points. The termination point may be, for example, a point on the boundary of the uncovered region. As a result of the edge extension until termination, the uncovered region is divided such that each division may be associated with an adjacent segment. Edge extension until termination and the resulting division of an uncovered region are depicted, for example, in FIG. 6 (described below). FIG. 9 depicts an example of multiple edge extensions until termination and the resulting division of an uncovered region.

In one embodiment, using the output of the predictor 320, a segment expander may be configured to apply a predictive filling routine. Such a routine may be used to expand lower-frequency information from the adjacent segments to the associated division of the uncovered region.

Figure 4:
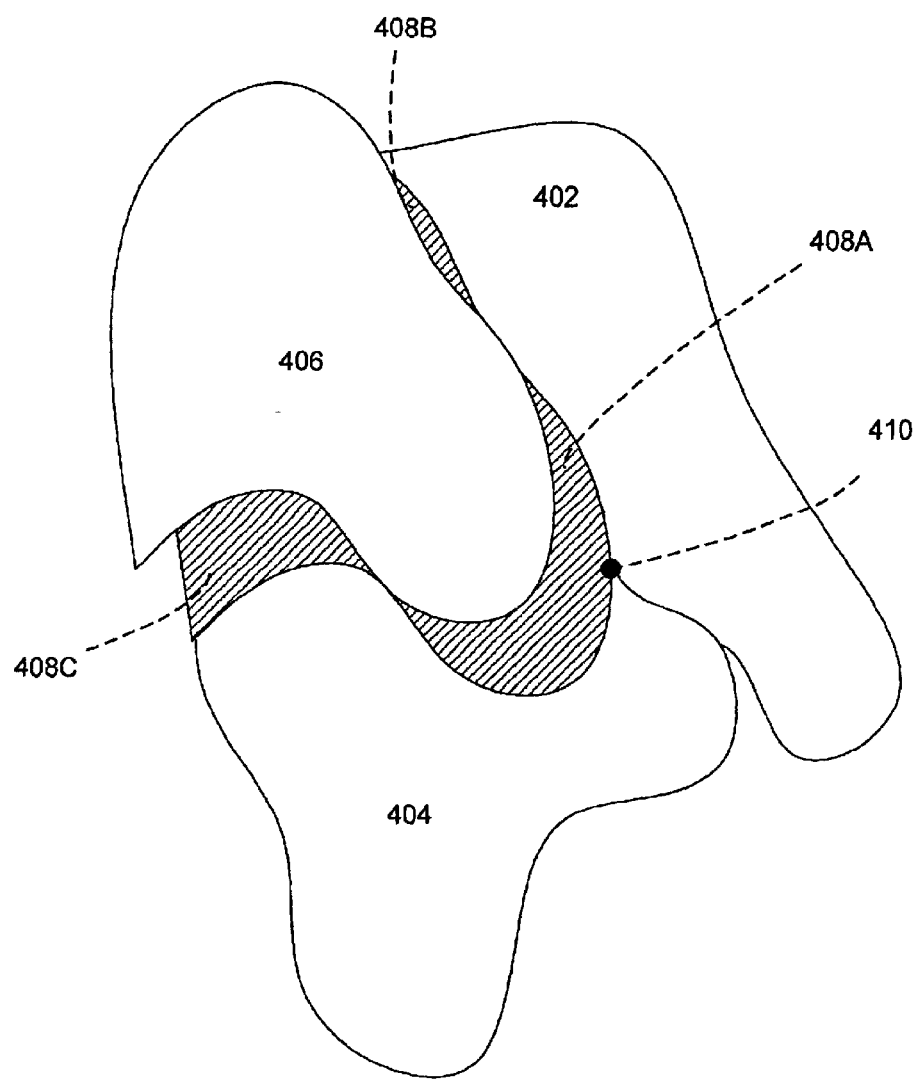
FIG. 4 is an illustration depicting a trivalent point adjacent to an uncovered region in accordance with an embodiment of the invention.

FIG. 4 is an illustration depicting a trivalent point adjacent to an uncovered region in accordance with an embodiment of the invention. The illustration shows three adjacent image segments 402, 404, and 406. The third segment 406 moves from first image frame to a second image frame. The position of the third segment 406 in the second frame is shown by the solid white region labeled 406. Previously hidden areas that are exposed by movement of the third segment 406 from the first to second frames is shown by the diagonally-striped areas (408A, 408B, and 408C). These previously hidden areas correspond to uncovered regions. The following discussion focuses on the first uncovered region labeled 408A.

The first uncovered region 408A is adjacent to the first and second image segments 402 and 404. At the intersection of the uncovered region 408A and those two segments 402 and 404 is shown a trivalent point 410. In accordance with an embodiment of the invention, the trivalent point 410 is a starting point for the edge extension.

Figure 5:
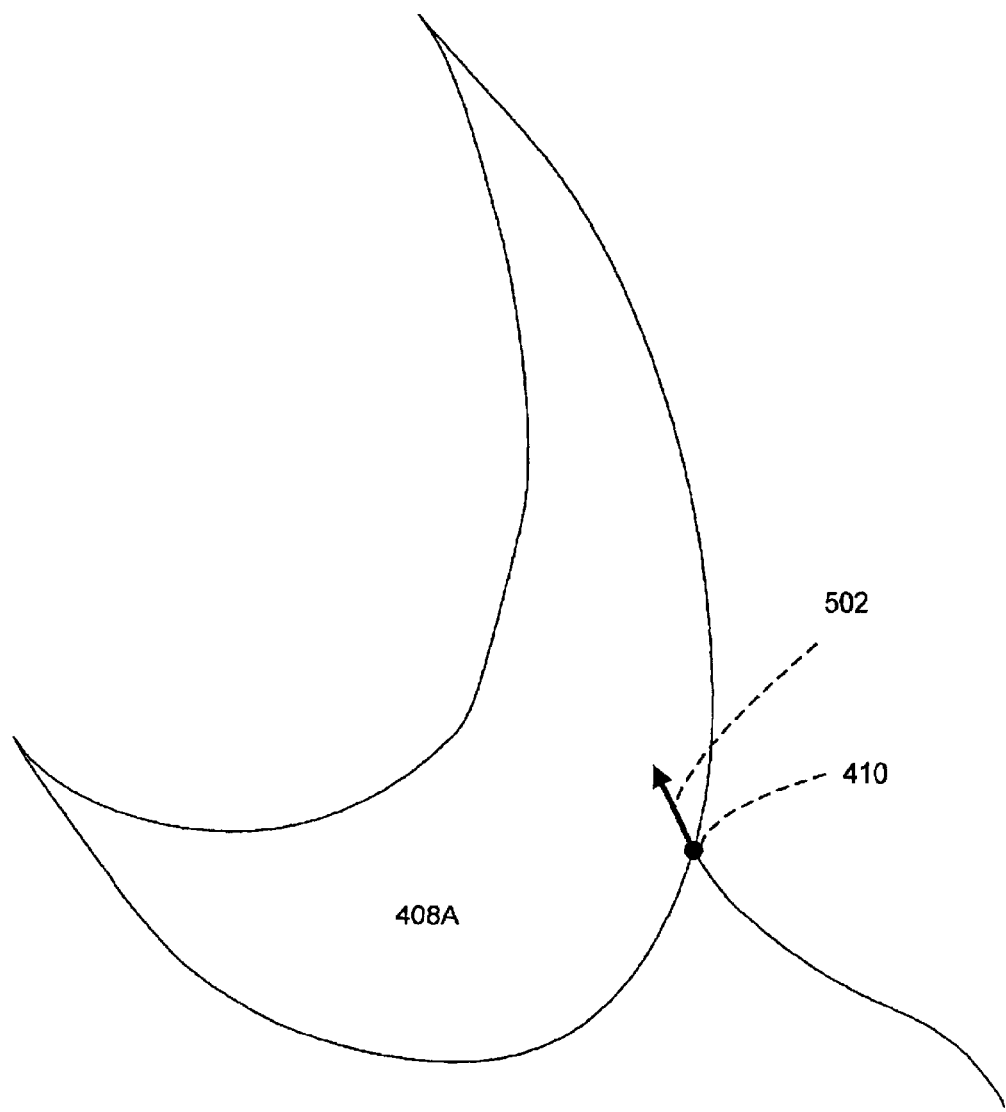
FIG. 5 is an illustration depicting predictive extension of an edge in accordance with an embodiment of the invention.

FIG. 5 is an illustration depicting predictive extension (or extrapolation) of an edge in accordance with an embodiment of the invention. The illustration shows the extrapolation 502 beginning at the starting point 410 and extending the edge between the first and second segments 402 and 404 into the uncovered region 408A. The extrapolation 502 may be performed using directional information from previous points of the edge.

In accordance with one embodiment, the extrapolation 502 depends on an average directional (tangent) vector from previous edge points. For example, directional vectors from the previous ten (10) edge points may be averaged to determine the average directional vector that indicates the extrapolated location of the next edge point. Of course, more or less than ten (10) edge points may be used. In accordance with another embodiment, the extrapolation uses a polynomial predictive algorithm. Polynomial predictive algorithms may be used to extrapolate signals. Here polynomical prediction may be used to extrapolate the edges. Polynomial prediction may involve taking the portion of the edge to be extended (that close to the trivalent point) and modeling it by an nth-degree polyomial. Typically, a relatively low-degree ($4^{th}$ degree or less) would be practical. Other algorithms may also be used and are contemplated to be within the scope of the invention.

Figure 6:
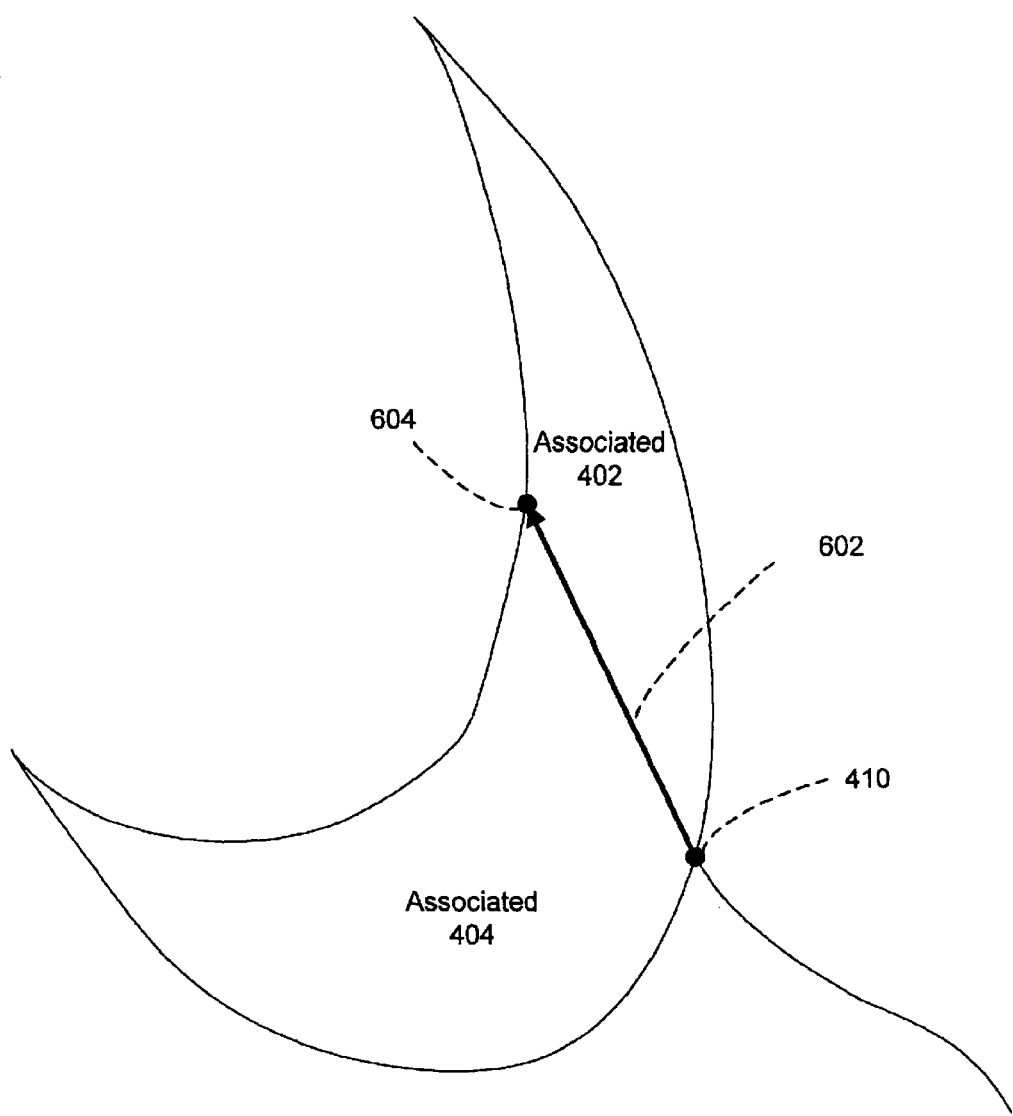
FIG. 6 is an illustration depicting the predictive extension of an edge terminating at a boundary of the uncovered region in accordance with an embodiment of the invention.

FIG. 6 is an illustration depicting the predictive extension of an edge terminating at a boundary of the uncovered region in accordance with an embodiment of the invention. The example depicted in FIG. 6 shows the predictive extension 602 continuing from the starting point 410 until it reaches a termination point 604 at a boundary of the uncovered region 408A. While the extension 602 is depicted as a straight line in FIG. 6, it need not be such a straight line. Instead, as described above in relation to FIG. 5, the extension may be a non-straight line determined using, for example, an average directional vector or a polynomial predictive algorithm. The completed extension of the edge divides the uncovered region 408A into two divisions, one associated with adjacent segment 402 and the other associated with adjacent segment 404.

FIG. 7 is an illustration depicting multiple trivalent points adjacent to an uncovered region in accordance with an embodiment of the invention. The example of FIG. 7 differs from the example of FIG. 4 in that there are depicted three image segments (702, 704, and 706) adjacent to the uncovered region 408A. Since there are three adjacent segments, there are now two starting points 708 and 710. In accordance to an embodiment of the invention, the two starting points may each be located at a trivalent point between the uncovered region 408A and two of the segments. In other examples, of course, there may be more than three adjacent segments and hence more than two starting points.

FIG. 8 is an illustration depicting predictive extension (or extrapolation) of multiple edges in accordance with an embodiment of the invention. The illustration shows the extrapolations 802 and 804 beginning at the starting points 708 and 710, respectively. The first extrapolation 802 extends the edge between the first and second segments 702 and 704 into the uncovered region 408A. The second extrapolation 804 extends the edge between the second and third segments 704 and 706 into the uncovered region 408A. As described above in relation to FIG. 5, each extrapolation (802 or 804) may be performed using directional information from previous points of its respective edge.

FIG. 9 is an illustration depicting the predictive extension of a first edge that terminates at a boundary of the uncovered region and of a second edge that terminates at the first edge in accordance with an embodiment of the invention. The example depicted in FIG. 6 shows the first and second predictive extensions (902 and 904, respectively), continuing in parallel from the first and second starting points (708 and 710, respectively), until they reach the first and second termination points (906 and 908, respectively).

The first termination point 906 occurs at a boundary of the uncovered region 408A. This first type of termination point is discussed above in relation to FIG. 6. On the other hand, the second termination point 908 is not at a boundary of the uncovered region 408A. Instead, the second termination point 908 occurs when the second predictive extension 904 intersects the first predictive extension 902. In other words, the predictive extension of the second edge terminates at the first edge. This is a second type of termination point in accordance with an embodiment of the invention.

The completed extensions of the edges divide the uncovered region 408A into three divisions. A first division is associated with first adjacent segment 702. A second division is associated with the second adjacent segment 704. A third division is associated with the third adjacent segment 706.

Of course, while the extensions 902 and 904 are depicted as straight lines in FIG. 6, they need not be straight lines. Instead, as described above in relation to FIG. 5, the extensions 902 and 904 may be a non-straight line determined using, for example, an average directional vector or a polynomial predictive algorithm.

Figure 10:
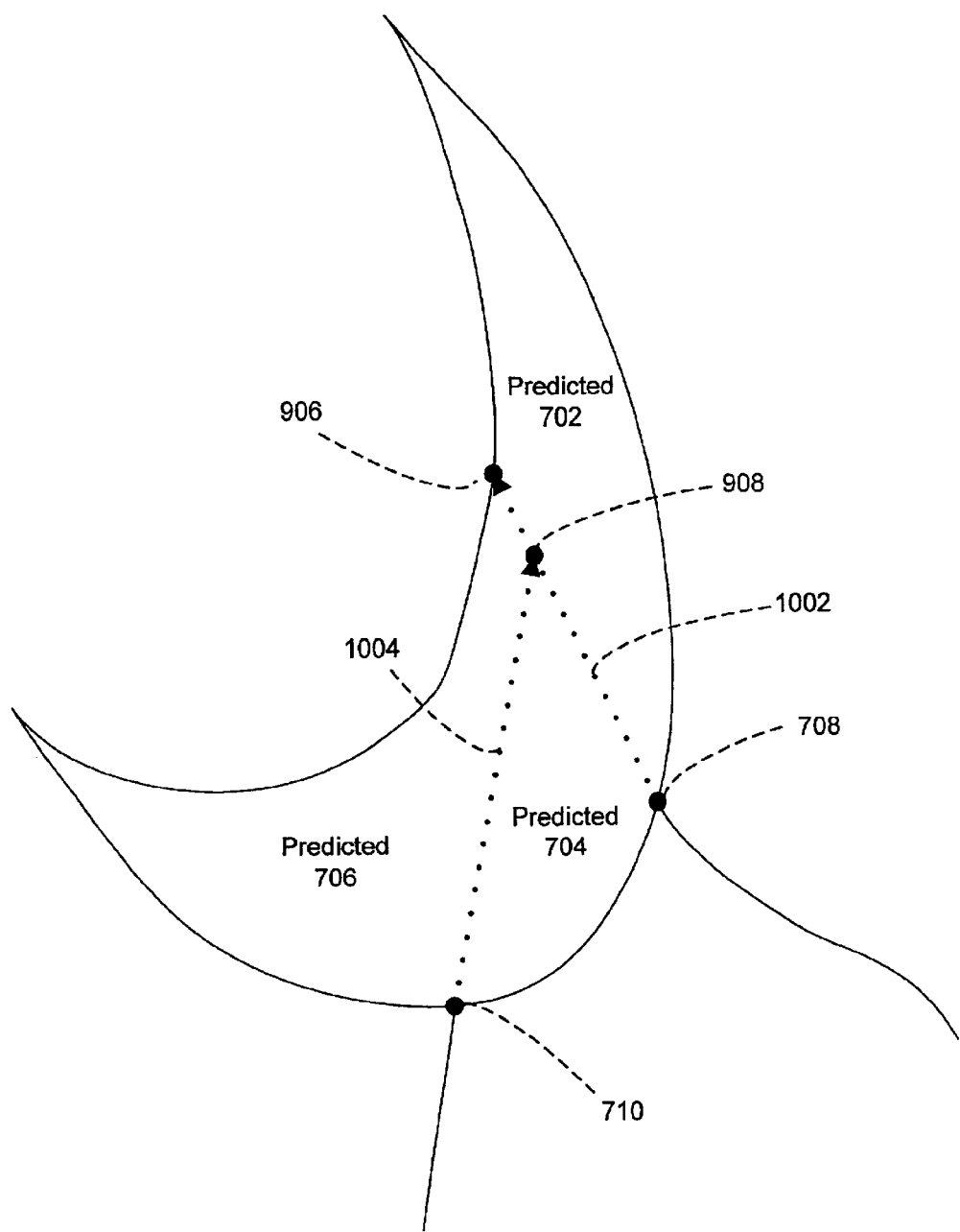
FIG. 10 is an illustration depicting predictive extension of an edge that skips intermediary points in accordance with an embodiment of the invention.

FIG. 10 is an illustration depicting predictive extension of an edge that skips intermediary points in accordance with an embodiment of the invention. As illustrated in FIG. 10, the extrapolation may not predict every point in the extensions 902 and 904 by an extrapolating algorithm. Instead, only certain points such as, for example, every nth point, may be predicted. The "intermediary" points in between the predicted points may be filled in later, for example, by interpolation between predicted points. In other words, the intermediary points are subsequently determined by filling in between the dots of the dotted line.

Using the above-described techniques, the predictive filling process may be performed for each surrounding segment until all of the segment boundaries have been extended into the newly uncovered image region. Such a process provides a prediction for the image content in the uncovered region. Of course, this prediction may vary from the actual content of the uncovered region.

FIG. 11 is a diagram of a system for communicating video in accordance with an embodiment of the invention. As depicted, the system 1100 may include an encoder 1102, a decoder 1104, and a communications channel 1106. The communications channel 1106 connects the encoder 1102 to the decoder 1104 and provides a channel for transmitting information between the two devices.

Generally, an encoder receives a raw, i.e., uncompressed, image frame, manipulates and compresses the image frame, and transmits the compressed image to an decoder. The decoder then decompresses, i.e., reconstructs, the image frame. The encoder manipulates portions of image frames called image segments. Often, as segments change location from frame to frame, there are newly uncovered regions that come into view. The encoder, having the original raw image, knows the complete structure of the newly uncovered image regions. However, the decoder likely has no information regarding the image data within the newly uncovered image regions.

As depicted in FIG. 11, the encoder 1102 receives image data and, in accordance with an embodiment of the invention, is configured to process the image data using a predictor 320, such as one described above in relation to FIG. 3. The encoder 1102 subsequently transmits encoded image information across the communications channel 1106 to the decoder 1104. The decoder 1104 receives the encoded video information and uses it to reconstruct the image.

In accordance with one embodiment, the decoder 1104 may perform the reconstruction utilizing a same or equivalent predictor 302 algorithm as the encoder 1102 uses. Advantageously in such a system 1100, the encoder 1102 does not need to transmit the predicted filling of the uncovered regions. This is because the encoder 1102 and the decoder 1104 are able to use the same or equivalent predictive filling.

Figure 12A:
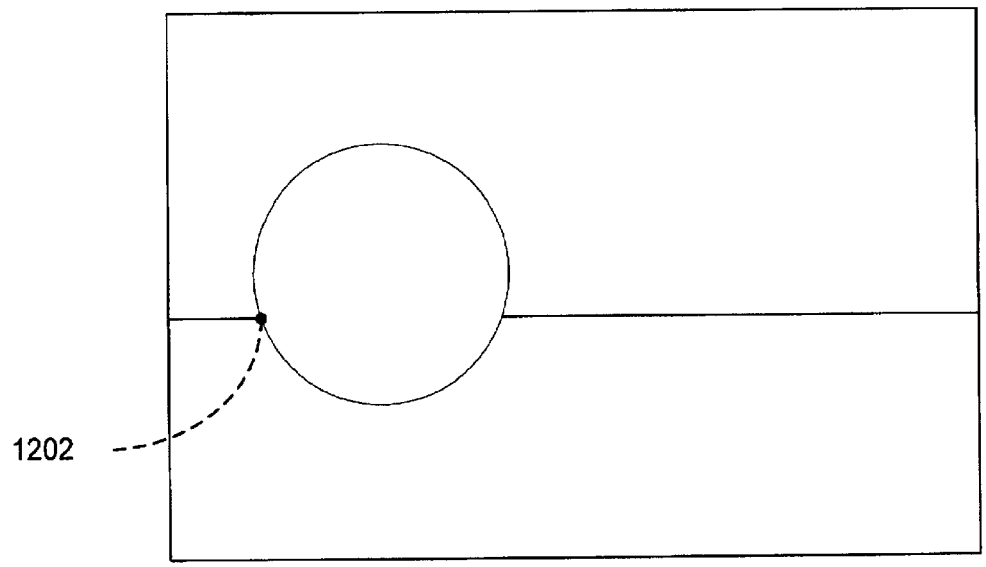
FIGS. 12A–C depict another example of a trivalent point that may be used as a starting point in accordance with an embodiment of the invention.
Figure 12B:
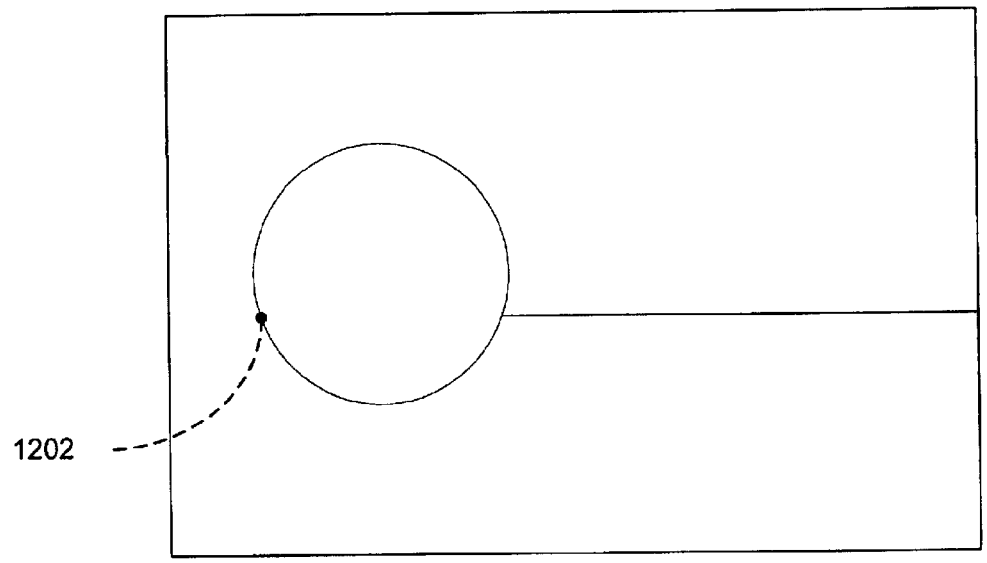
Figure 12C:
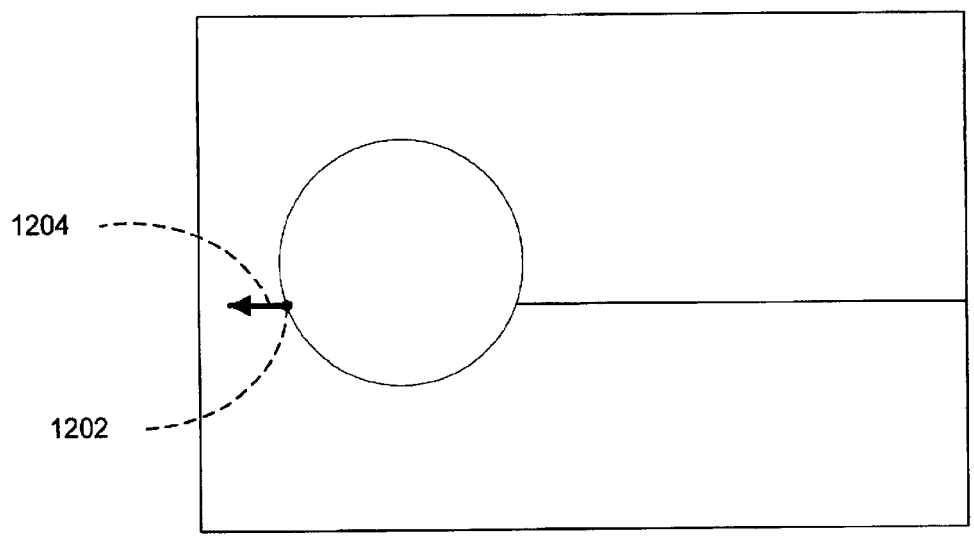

FIGS. 12A–C depict another example of a trivalent point that may be used as a starting point in accordance with an embodiment of the invention. In this example, FIG. 12A depicts frame N−1, and FIG. 12B depicts frame N, where frame N−1 represents a preceding frame in a video sequence and frame N represents the current frame.

Consider, for example, that these figures illustrate a ball rolling from left to right and that the line behind the ball represents a horizon in the image. Consider also that the camera is panning from left to right following the ball's motion. In FIG. 12B, the region to the left of the ball is shown as blank because that region is an uncovered region (newly exposed hidden area) in this example. In accordance with an embodiment, the present invention may be applied to such an uncovered region. In particular, the trivalent point 1202 from FIG. 12A (the prior frame) is used as the starting point. FIG. 12C shows the extrapolation 1204 beginning from that point 1202. In such a case, directional information from the edge in FIG. 12A (the edge ending at the starting point 1202) may be used in determining the direction of extrapolation 1204.

In one embodiment, the encoder and the decoder both determine the image segments surrounding an uncovered region so that this information does not need to be transmitted. In another embodiment, the information about the surrounding segments may be transmitted from the encoder to the decoder since relatively few bits of information may be required to do so. (In the latter embodiment, the decoder may not need a surrounding segment determinator 321.) In one embodiment, the encoder and the decoder both determine the starting points so that the starting points do not need to be transmitted. In another embodiment, the locations of the starting points may be transmitted from the encoder to the decoder since relatively few bits of information may be required to do so. (In the latter embodiment, the decoder may not need a junction identifier 322.) Once the starting point has been determined, the encoder and decoder may make identical predictions as to the location of the next point on the segment boundary contained within the newly uncovered region. Again, since the encoder and decoder are using the same image, the prediction or guess will be identical.

The encoder may also determine corrective information by comparing the predicted filling of the uncovered regions with the actual image data in the uncovered regions. The corrective information relates to the difference between the predicted and actual data. In one embodiment, the corrective information is transmitted from the encoder to the decoder. This provides the information needed for the decoder to accurately reconstruct the image frame with only a relatively low amount of information needing to be transmitted over the communications channel 1106. In other words, the encoder, knowing the prediction that the decoder will make, and knowing the correct location of the subsequent edge location, can send corrective information to the decoder. In one embodiment where the encoder and the decoder may determine every $N^{th}$ extrapolated boundary point, the encoder may send corrective information for every $N^{th}$ point, and the decoder can interpolate the intermediary points.

Therefore, one embodiment according to the present invention provides for an efficient method by which the encoder transmits the high frequency image data of the newly uncovered image region to the decoder. The high frequency image data corresponds to sharp color transitions (fore example, segment edges) within the image data. The encoder could transmit the pixel locations corresponding to the high frequency image data, but that method would be bandwidth expensive. Bandwidth usage can be reduced by assuming that the structure of the newly uncovered region will very likely be an extension of surrounding segments. Therefore, a decoder may instead attempt to extend the high frequency information of the surrounding segments into the newly uncovered region. In the preferred embodiment, the high frequency image information generally corresponds to segment boundaries or edges.

What is claimed is:

1. A method for image processing, the method comprising:

locating an uncovered region in an image;

identifying a trivalent point adjacent to the uncovered region;

extrapolating from the trivalent point to extend an edge of edge points into the uncovered region; and using the extended edge to predictively fill the uncovered region, wherein prior to extension the edge terminated at the trivalent point.

2. The method of claim 1, wherein the trivalent point comprises a point which lies at a junction of at least three objects from a group of objects including image segments and the uncovered region.

3. The method of claim 2, wherein the trivalent point comprises a ternary junction previously between three image segments, and wherein at least one of the three image segments has moved so that the trivalent point becomes adjacent to the uncovered region.

4. The method of claim 2, wherein the trivalent point is part of a common boundary between two adjacent image segments, and wherein the trivalent point terminates the common boundary at the uncovered region.

5. The method of claim 1, wherein shared boundaries between the uncovered region and each of the image segments are at least of a threshold length.

6. The method of claim 1, wherein the extrapolating depends on an average directional vector based on preceding edge points.

7. The method of claim 1, wherein the extrapolating uses a polynomial predictive routine based on preceding edge points.

8. The method of claim 1, wherein multiple trivalent points are determined.

9. The method of claim 8, wherein the extrapolating extends multiple edges one at a time, and wherein the extrapolating of each edge terminates if a boundary of the uncovered region is reached.

10. The method of claim 8, wherein the extrapolating extends multiple edges in parallel, and wherein the extrapolating of each edge terminates if another edge is intersected.

11. The method of claim 8, wherein the extrapolating skips intermediary points in extending the edge, and wherein the intermediary points are determined by a form of interpolation.

12. An apparatus for image processing, the apparatus comprising:
    a hidden area locator for locating an uncovered region in an image;
    a junction identifier for identifying a starting point adjacent to the uncovered region; and
    an edge extender for extrapolating from the starting point to extend an edge of edge points into the uncovered region,
    wherein prior to extension the edge terminated at the starting point.

13. The apparatus of claim 12, wherein junction identifier identifies the starting point as a trivalent point at a junction of at least three objects from a group of objects including image segments and uncovered region.

14. The apparatus of claim 13, wherein junction identifier identifies the trivalent point at ternary junction previously between three image segments, and wherein at least one of the three image segments has moved so that the trivalent point becomes adjacent to the uncovered region.

15. The apparatus of claim 13, wherein junction identifier identifies the trivalent point from a common boundary between two adjacent image segments, and wherein the trivalent point terminates the common boundary at the uncovered region.

16. The apparatus of claim 12, further comprising:
    a boundary length checker which verifies that shared boundaries between the uncovered region and each of the image segments are at least of a threshold length.

17. The apparatus of claim 12, wherein the edge extender extrapolates the edge using an average directional vector based on preceding edge points.

18. The apparatus of claim 12, wherein the edge extender extrapolates the edge using a polynomial predictive routine based on preceding edge points.

19. The apparatus of claim 12, wherein the junction identifier identifies multiple starting points adjacent to the uncovered region.

20. The apparatus of claim 19, wherein the edge extender extrapolates multiple edges one at a time, and wherein the extrapolating of each edge terminates if a boundary of the uncovered region is reached.

21. The apparatus of claim 19, wherein the edge extender extrapolates multiple edges in parallel, and wherein the extrapolating of each edge terminates if another edge is intersected.

22. The apparatus of claim 19, wherein the edge extender skips intermediary points in extending the edge, and wherein the intermediary points are determined by a form of interpolation.

23. The apparatus of claim 12, wherein the apparatus comprises an encoder.

24. The apparatus of claim 23, wherein the encoder is configured to transmit compressed video information to a decoder, and wherein the decoder also includes the junction identifier and the edge extender.

25. The apparatus of claim 23, wherein the encoder is configured to transmit locations of starting points for the uncovered region to a decoder, and wherein the decoder includes the edge extender.

26. The apparatus of claim 23, wherein the encoder calculates corrective data between a predicted content of the uncovered region and an actual content of the uncovered region, and wherein the compressed video information includes the corrective data.

27. The apparatus of claim 12, wherein the apparatus comprises a decoder.

28. The apparatus of claim 27, wherein the decoder is configured to receive compressed video information from an encoder, and wherein the encoder also includes the hidden area locator, the junction identifier, and the edge extender.

29. The apparatus of claim 28, wherein the compressed video information includes corrective data between a predicted content of the uncovered region and an actual content of the uncovered region, and wherein the decoder applies the corrective information to reconstitute the more accurate content of the uncovered region.

30. A system for efficiently communicating video information, the system comprising:
    an encoder that encodes a video frame into an encoded frame; and
    a decoder that receives and decodes the encoded frame,
    wherein the encoder is configured to locate uncovered regions and neighboring image segments in the video frame,
    wherein the encoder predictively extends edges into the uncovered region according to a specific method, and
    wherein the decoder also predictively extends edges the uncovered region according to the specific method.

31. The system of claim 30, wherein the specific method comprises:
    determining a starting point; and
    extrapolating from the starting point to extend an edge of a neighboring image segment into the uncovered region.

32. The system of claim 31, wherein the starting point comprises a trivalent point at an intersection between the uncovered region and two neighboring image segments that are adjacent to each other and adjacent to the uncovered region.

33. The system of claim 32, wherein the edge begins at the trivalent point bordering the uncovered region and terminates at the boundary of the uncovered region.

34. The system of claim 31, wherein the extrapolating depends on an average directional vector based on preceding edge points.

35. The system of claim 31, wherein the extrapolating uses a polynomial predictive routine based on preceding edge points.

* * * * *

UNITED STATES PATENT AND TRADEMARK OFFICE
CERTIFICATE OF CORRECTION

PATENT NO. : 6,898,240 B2
DATED : May 24, 2005
INVENTOR(S) : Prakash et al.

Page 1 of 1

It is certified that error appears in the above-identified patent and that said Letters Patent is hereby corrected as shown below:

<u>Title page,</u>
Item [75], Inventors, after "Adityo Prakash, Redwood Shores, CA (US);", replace "Eniko F. Prakash" with -- Eniko Fodor --.

Signed and Sealed this

Thirtieth Day of August, 2005

JON W. DUDAS
*Director of the United States Patent and Trademark Office*